US010040905B2

(12) United States Patent
Gorodisher et al.

(10) Patent No.: US 10,040,905 B2
(45) Date of Patent: Aug. 7, 2018

(54) BENZOXAZINE POLYMERIZATION

(71) Applicant: 3M INNOVATIVE PROPERTIES COMPANY, St. Paul, MN (US)

(72) Inventors: Ilya Gorodisher, Stillwater, MN (US); Robert J. Webb, Hudson, WI (US); Guy D. Joly, Shoreview, MN (US); George W. Griesgraber, Eagan, MN (US); Robert J. Devoe, Minnetonka, MN (US)

(73) Assignee: 3M Innovative Properties Company, St. Paul, MN (US)

(*) Notice: Subject to any disclaimer, the term of this patent is extended or adjusted under 35 U.S.C. 154(b) by 231 days.

(21) Appl. No.: 15/023,753

(22) PCT Filed: Oct. 6, 2014

(86) PCT No.: PCT/US2014/059240
§ 371 (c)(1),
(2) Date: Mar. 22, 2016

(87) PCT Pub. No.: WO2015/057414
PCT Pub. Date: Apr. 23, 2015

(65) Prior Publication Data
US 2016/0229957 A1     Aug. 11, 2016

Related U.S. Application Data

(60) Provisional application No. 61/891,597, filed on Oct. 16, 2013.

(51) Int. Cl.
*C08G 73/02* (2006.01)
*C08L 79/02* (2006.01)
*C08F 220/30* (2006.01)

(52) U.S. Cl.
CPC .......... *C08G 73/0233* (2013.01); *C08L 79/02* (2013.01); *C08F 2220/302* (2013.01); *C08G 2270/00* (2013.01); *C08L 2205/04* (2013.01); *C08L 2205/06* (2013.01)

(58) Field of Classification Search
CPC ................................ C08F 20/38; C08F 22/24
See application file for complete search history.

(56) References Cited

U.S. PATENT DOCUMENTS

| | | | |
|---|---|---|---|
| 3,018,262 A | 1/1962 | Schroeder | |
| 3,298,998 A | 1/1967 | McConnell | |
| 3,496,250 A | 2/1970 | Czerwinski | |
| 3,959,236 A | 5/1976 | Peska et al. | |
| 4,868,288 A | 9/1989 | Meier | |
| 5,059,701 A | 10/1991 | Keipert | |
| 5,073,476 A | 12/1991 | Meier | |
| 5,089,536 A * | 2/1992 | Palazzotto | C08F 10/00 427/520 |
| 5,191,101 A | 3/1993 | Palazzotto | |
| 5,543,516 A | 8/1996 | Ishida | |
| 5,554,664 A | 9/1996 | Lamanna | |
| 6,177,230 B1 | 1/2001 | Kawamura | |
| 6,207,786 B1 | 3/2001 | Ishida | |
| 6,225,440 B1 * | 5/2001 | Ishida | C08G 73/02 528/403 |
| 6,376,080 B1 * | 4/2002 | Gallo | C08G 73/02 427/385.5 |
| 6,956,091 B2 | 10/2005 | Hong | |
| 7,041,772 B2 | 5/2006 | Aizawa | |
| 7,053,138 B2 | 5/2006 | Magendie | |
| 7,517,925 B2 | 4/2009 | Dershem | |
| 8,383,706 B2 | 2/2013 | Gorodisher | |
| 2003/0125551 A1 * | 7/2003 | Dershem | C07D 265/16 544/69 |
| 2003/0208018 A1 | 11/2003 | Hong | |
| 2008/0102407 A1 * | 5/2008 | Ohsawa | C08F 20/22 430/286.1 |
| 2010/0212524 A1 * | 8/2010 | Suzuki | B41C 1/1008 101/463.1 |
| 2010/0307680 A1 * | 12/2010 | Gorodisher | C08G 73/06 156/311 |
| 2011/0174179 A1 * | 7/2011 | Shimono | B41C 1/1008 101/453 |
| 2012/0129103 A1 * | 5/2012 | Ohsawa | C07C 309/12 430/285.1 |
| 2012/0301662 A1 * | 11/2012 | Yamashita | C08G 59/4014 428/114 |
| 2013/0089819 A1 * | 4/2013 | Kawaue | C07C 309/04 430/285.1 |
| 2014/0221601 A1 * | 8/2014 | Gorodisher | C08G 73/0233 528/350 |

FOREIGN PATENT DOCUMENTS

| | | |
|---|---|---|
| CA | 1300307 | 5/1992 |
| DE | 10028487 | 2/2001 |

(Continued)

OTHER PUBLICATIONS

Sperling, "Interpenetrating Polymer Networks", 272-311.
Kimura, "New Thermosetting Resin From Bisphenol A-Based Benzoxazine and Bisoxazoline", Journal of Applied Polymer Science, Jun. 20, 1999, vol. 72, No. 12, pp. 1551-1558.
Yamashita, "Ring-Opening Polymerization of 1,3-Benzoxazines by p-Toluenesulfonates as Thermally Latent Initiators", Journal of Polymer Science Part A: Polymer Chemistry, Jun. 14, 2011, vol. 49, No. 16, pp. 3631-3636.

(Continued)

*Primary Examiner* — Michael M Dollinger
(74) *Attorney, Agent, or Firm* — Kent S. Kokko

(57) ABSTRACT

Poly(benzoxazine) polymer are prepared by heating a benzoxazine compound in the presence of a (meth)acrylate copolymer having pendent tosylate groups, resulting in an interpenetrating polymer network of a poly(benzoxazine) and a crosslinked (meth)acrylate copolymer.

17 Claims, No Drawings

(56) References Cited

FOREIGN PATENT DOCUMENTS

| | | |
|---|---|---|
| JP | 11-293129 | 10/1999 |
| JP | 2008-56795 | 3/2008 |
| WO | WO 2002-00757 | 1/2002 |
| WO | WO 2003-042196 | 5/2003 |
| WO | WO 2011-047939 | 4/2011 |
| WO | WO 2012-018753 | 2/2012 |
| WO | WO 2012-134731 | 10/2012 |
| WO | WO 2012-135180 | 10/2012 |
| WO | WO 2013-048851 | 4/2013 |
| WO | WO 2013/148408 | 10/2013 |
| WO | WO 2014-052255 | 4/2014 |
| WO | WO 2014-105422 | 7/2014 |
| WO | WO 2014-179100 | 11/2014 |

OTHER PUBLICATIONS

International Search Report for PCT International Application No. PCT/US2014/059240 dated Feb. 24, 2015, 3 pages.

\* cited by examiner

BENZOXAZINE POLYMERIZATION

CROSS REFERENCE TO RELATED APPLICATIONS

This application is a national stage filing under 35 U.S.C. 371 of PCT/US2014/059240, filed Oct. 6, 2014, which claims the benefit of U.S. Application No. 61/891,597, filed Oct. 16, 2013, the disclosure of which is incorporated by reference in its/their entirety herein.

FIELD OF THE INVENTION

A process of preparing polybenzoxazines using a tosylate-functional (meth)acrylate (co)polymer is described.

BACKGROUND

Benzoxazines and compositions containing benzoxazine are known (see, for example, U.S. Pat. Nos. 5,543,516 and 6,207,786 to Ishida et al.; S. Rimdusit and H. Ishida, "Development of New Class of Electronic Packaging Materials Based on Ternary Systems of Benzoxazine, Epoxy, and Phenolic Resins", Polymer, 41, 7941-49 (2000); and H. Kimura et al., "New Thermosetting Resin from Bisphenol A-based Benzoxazine and Bisoxazoline", J. App. Polym. Sci., 72, 1551-58 (1999).

U.S. Pat. No. 7,517,925 (Dershem et al.) describes benzoxazine compounds and thermosetting resin compositions prepared therefrom. The compositions are said to be useful for increasing adhesion at interfaces within microelectronic packages and low shrinkage on cure and low coefficient of thermal expansion (CTE).

U.S. Pat. No. 7,053,138 (Magendie et al.) describes compositions comprising benzoxazines and thermoplastic or thermoset resins in the manufacture of prepregs and laminates. The compositions are said to yield flame-proofed laminating resins that have high glass transition temperatures.

U.S. Pat. No. 6,376,080 (Gallo) describes a method of preparing a polybenzoxazine which includes heating a molding composition including a benzoxazine and a heterocyclic dicarboxylic acid to a temperature sufficient to cure the molding composition, thereby forming the polybenzoxazine. The compositions are said to have near-zero volume change after post cure.

U.S. Pat. No. 6,207,786 (Ishida et al.) states that the polymerization of benzoxazine monomers to a polymer is believed to be an ionic ring opening polymerization which converts the oxazine ring to another structure, e.g., linear polymer or larger heterocyclic rings. It is thought that a chain transfer step(s) limits the molecular weight of the resulting polymer and causes some branching. FTIR (Fourier transform infrared) analysis is often used to monitor the conversion of the oxazine rings to polymers to provide an estimate of the rate of polymerization at different temperatures. NMR (nuclear magnetic resonance) spectroscopy can also be used to monitor conversion of benzoxazine monomers to polymer.

Epoxy adhesives have been widely used in structural adhesive applications and satisfy many demanding industrial applications. However epoxies have many noted deficiencies that limit their use including limited high temperature stability, high moisture uptake, shrinkage, and a large exotherm on polymerization.

Polybenzoxazines have been proposed to overcome many of the limitations on epoxies. They have lower exotherms on curing, less shrinkage, have higher thermal stability, low byproducts and may be readily prepared from benzoxazines, which in turn, are readily prepared from an amine, formaldehyde and a phenol in high yields. However, current methods of preparing polybenzoxazines require relatively high temperatures, and typically produce brittle, highly crosslinked polymers.

Efforts to reduce the polymerization temperature have included the addition of various phenols or Lewis acid accelerators, or copolymerization of the benzoxazine with epoxides or other monomers such as phenol-formaldehyde. However the resultant polybenzoxazines-epoxy hybrids retain many of the limitations of the epoxies, and compromise many desirable features thereof, such as epoxy toughness.

SUMMARY

The present disclosure is directed to a curable composition comprising a benzoxazine compound and a (meth)acrylate (co)polymer having pendent tosylate groups. The curable composition may be cured to produce cured compositions useful in coating, sealants, adhesive and many other applications. The present disclosure further provides a curable composition comprising a benzoxazine compound and a (meth)acrylate (co)polymer having pendent tosylate groups, which when cured, is useful in high temperature structural adhesive applications. The present disclosure further provides a method of preparing a polybenzoxazine comprising heating the curable composition at a temperature, and for a time sufficient, to effect polymerization.

In one embodiment, the present disclosure provides a polymerizable composition including: a benzoxazine; (meth)acrylate (co)polymer having pendent tosylate groups; and a film-forming material, a co-catalyst, a curative, or a combination thereof. In certain embodiments, a polymerizable composition can further include a toughener (i.e., toughening agent), an epoxy resin, a reactive diluent, or combinations thereof.

The present disclosure overcomes many of the deficiencies noted for the polymerization of polybenzoxazines including lower polymerization temperatures and reduced exotherms. In some embodiments, the product polybenzoxazines are flexible solids having good thermal stability, and are useful for many industrial applications.

As used herein, the term "benzoxazine" is inclusive of compounds and polymers having the characteristic benzoxazine ring. In the illustrated benzoxazine group, R is the residue of a mono- or poly-aromatic amine.

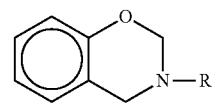

I

As used herein "polybenzoxazine" refers to a compound having two or more benzoxazine rings.

As used herein "poly(benzoxazine)" refers to the polymer resulting from ring-opening polymerization of benzoxazine or polybenzoxazine compounds.

As used herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

As used herein, the term "heteroalkyl" includes both straight-chained, branched, and cyclic alkyl groups with one or more heteroatoms independently selected from S, O, and N both unsubstituted and substituted alkyl groups. Unless otherwise indicated, the heteroalkyl groups typically contain from 1 to 20 carbon atoms. "Heteroalkyl" is a subset of "hetero(hetero)hydrocarbyl" described below. Examples of "heteroalkyl" as used herein include, but are not limited to, methoxy, ethoxy, propoxy, 3,6-dioxaheptyl, 3-(trimethylsilyl)-propyl, 4-dimethylaminobutanyl, and the like. Unless otherwise noted, heteroalkyl groups may be mono- or polyvalent.

As used herein, "aryl" is an aromatic group containing 6-18 ring atoms and can contain fused rings, which may be saturated, unsaturated, or aromatic. Examples of an aryl group include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent.

As used herein, "(hetero)hydrocarbyl" is inclusive of (hetero)hydrocarbyl alkyl and aryl groups, and hetero(hetero)hydrocarbyl heteroalkyl and heteroaryl groups, the later comprising one or more catenary oxygen heteroatoms such as ether or amino groups. Hetero(hetero)hydrocarbyl may optionally contain one or more catenary (in-chain) functional groups including ester, amide, urea, urethane and carbonate functional groups. Unless otherwise indicated, the non-polymeric (hetero)hydrocarbyl groups typically contain from 1 to 60 carbon atoms. Some examples of such (hetero) hydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl" and "heteroaryl" supra.

As used herein, the term "residue" is used to define the (hetero)hydrocarbyl portion of a group remaining after removal (or reaction) of the attached functional groups, or the attached groups in a depicted formula. For example, the "residue" of butyraldehyde, $C_4H_9$—CHO is the monovalent alkyl $C_4H_9$—. The residue of phenylene diamine $H_2N$—$C_6H_4$—$NH_2$, is the divalent aryl —$C_6H_4$—.

DETAILED DESCRIPTION

The present disclosure provides a method of preparing poly(benzoxazine) polymers by combining a benzoxazine compound and a (meth)acrylate (co)polymer having pendent tosylate groups, specifically a tosylate-functional copolymer, which when thermolyzed, forms a copolymer having pendent ethylenically unsaturated groups. In some embodiments, an like acid-catalyzed polymerization of benzoxazines, the product copolymer is incorporated into the poly (benzoxazine).

In the preparation of the polybenzoxazine, any benzoxazine compound derived from an aromatic amine may be used. Benzoxazines may be prepared by combining a phenolic compound, and aliphatic aldehyde, and a primary aromatic amine compound, such as aniline. U.S. Pat. No. 5,543,516 (Ishida) and U.S. Pat. No. 7,041,772 (Aizawa et al.) hereby incorporated by reference, describe methods of forming benzoxazines. Other suitable reaction schemes to produce mono-, di- and higher-functional benzoxazines are described in N. N. Ghosh et al., *Polybenzoxazine-new high performance thermosetting resins: synthesis and properties*, Prog. Polym. Sci. 32 (2007), pp. 1344-1391.

One suitable method of producing the starting benzoxazine compounds is illustrated by the following reaction scheme:

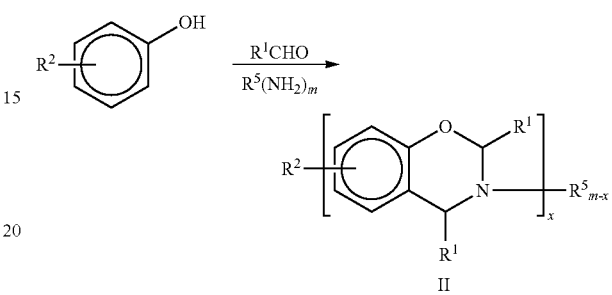

wherein
each $R^1$ is H or an alkyl group, and is the residue of an aliphatic aldehyde,
$R^2$ is H, a covalent bond, a phenol or a polyvalent (hetero) hydrocarbyl group, preferably H, a covalent bond or a divalent alkyl group;
$R^5$ is aryl residue of a primary amino compound, $R^5(NH_2)_m$, where $R^5$ is an aryl group, m is 1-4; and x is at least 1. It will be appreciated that as the $R^2$ group may be part of a polyphenolic compound, said $R^2$ group may bond to another benzoxazine ring as illustrated in Formula IV below. Similarly, as the $R^5$ may be derived from a polyamine, the $R^5$ may also be bonded to another benzoxazine ring as illustrated in Formula III below.

In the preparation of the starting benzoxazine, mono- or polyphenolic compounds may be used. The phenolic compound may be further substituted without limitation is desired. For example, the 3, 4, and 5 positions of the phenolic compound may be hydrogen or substituted with other suitable substituents such as alkyl, cycloalkyl, heterocycloalkyl, aryl, heteroaryl, aralkyl, heteroaralkyl, alkoxy, alkoxyalkylene, hydroxylalkyl, hydroxyl, haloalkyl, carboxyl, halo, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl. Desirably at least one of the positions ortho to the hydroxyl group is unsubstituted to facilitate benzoxazine ring formation.

The aryl ring of the phenolic compound may be a phenyl ring as depicted, or may be selected from naphthyl, biphenyl, phenanthryl, and anthracyl. The aryl ring of the phenolic compound may further comprise a heteroaryl ring containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl.

Examples or mono-functional phenols include phenol; cresol; 2-bromo-4-methylphenol; 2-allyphenol; 4-aminophenol; and the like. Examples of difunctional phenols (polyphenolic compounds) include phenolphthalein; biphenol; 4-4'-methylene-di-phenol; 4-4'-dihydroxybenzophenone; bisphenol-A; 1,8-dihydroxyanthraquinone; 1,6-dihydroxnaphthalene; 2,2'-dihydroxyazobenzene; resorcinol;

fluorene bisphenol; and the like. Examples of trifunctional phenols comprise 1,3,5-trihydroxy benzene and the like.

The aldehyde reactants used in preparing the benzoxazine starting materials include formaldehyde; paraformaldehyde; polyoxymethylene; as well as aldehydes having the general formula $R^1CHO$, where $R^1$ is H or an alkyl group, including mixtures of such aldehydes, desirably having from 1 to 12 carbon atoms. The $R^1$ group may be linear or branched, cyclic or acyclic, saturated or unsaturated, or combinations thereof. Other useful aldehydes include crotonaldehyde; acetaldehyde; propionaldehyde; butyraldehyde; and heptaldehyde.

Amino compounds useful in preparing the starting benzoxazine can be substituted or unsubstituted aromatic amines having at least one primary amine group. The amines may be aliphatic or aromatic amines. It can be substituted, for example, with groups such as alkyl, cycloalkyl, heterocycloalkyl, aryl, heteroaryl, aralkyl, or heteroaralkyl.

Amines useful in the preparation of the starting benzoxazine compounds include those of the formula $R^5(NH_2)_m$ include aryl monoamines and polyamines. $R^5$ is an aryl group that has a valence of m, and is the residue of a mono-, di- or higher aromatic amine having at least one primary amine group. Subscript m is 1 to 4.

Examples of useful aromatic amines include aniline, o-, m- or p-toluidine, 2,6-dimethyl aniline, 2,5-dimethyl aniline p-bromoaniline, 3,5-dimethyl aniline and 2,4-dimethyl aniline, p-nitroaniline, di-(4-aminophenyl)sulfone, di-(4-aminophenyl)ether, 2, 2-bis(4-aminophenyl)propane, 4,4'-diamino diphenylmethane, 3,3'-dimethyl(4,4'-diaminodiphenyl methane, m- or p-phenylene diamine, m-xylylene diamine, toluene diamine, 4,4'methylene dianiline benzidine, 4,4'-thiodianiline, 4-methoxy-1,3-phenyldiamine, 2,6-diaminopyridine, and dianisidine.

It will be understood that monoamines will cyclize with the aldehyde and phenolic compound to produce monobenzoxazine compounds, while di- or higher amines will cyclize to produce di- and poly-benzoxazine compounds: For example, a diamine (m=2 in the Scheme III below) will produce a di-benzoxazine.

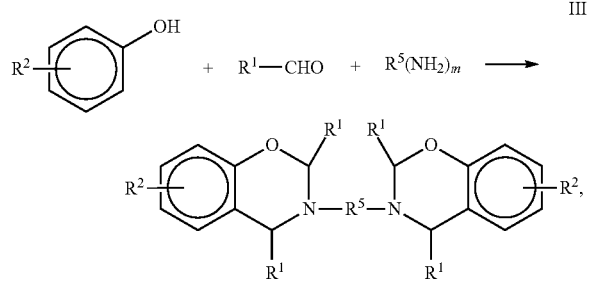

wherein each $R^1$ is H or an alkyl group, and is the residue of an aliphatic aldehyde;

$R^2$ is H, a covalent bond, or a polyvalent (hetero)hydrocarbyl group, preferably H, a covalent bond or a divalent alkyl group;

$R^5$ is the aryl residue of a primary amino compound.

Further, polymeric benzoxazines may be prepared from a polyphenolic compounds, such as bisphenol-A, and a di- or polyamine, which may be further ring-opening polymerized as shown in Formula IV:

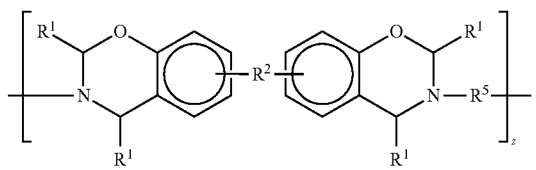

wherein
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^4$ is the (hetero)hydrocarbyl residue of a primary amino compound;
$R^5$ is the aryl residue of a primary amino compound;
z is at least 1, preferably 2 or greater.

The curable composition further comprises an tosylate-functional acrylic polymer. More specifically, a homo or copolymer of monomer units of the formula:

wherein
$R^1$ is H or $CH_3$;
$R^2$ is an $C_2$-$C_{10}$ alkylene, optionally containing one or more ether oxygen atoms, and
OTs is a tosylate (toluene sulfonate) group. Monomers of Formula V are readily prepared from hydroxyalkyl (meth) acrylates of the formula:

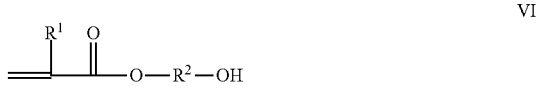

and a tosyl halide.

The polymer may comprise 100% of units of Formula V. In addition, the copolymer may comprise a (meth)acrylate ester monomer, which alcohol contains from 1 to 18 carbon atoms and preferably an average of from 4 to 12 carbon atoms. A mixture of such monomers may be used.

Examples of monomers suitable for use as the (meth) acrylate ester monomer include the esters of either acrylic acid or methacrylic acid with such as ethanol, 1-propanol, 2-propanol, 1-butanol, 2-butanol, t-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth) acrylate ester monomer are suitable.

The (co)polymer may be represented by the formula $—[M^{tosyl}]_a—[M^{ester}]_b—[M^{OH}]_c$ where $M^{tosyl}$ represents polymerized tosylate functional monomer units of Formula V having subscript a repeat units, $M^{ester}$ represents polymerized acrylic ester monomer units having subscript b repeat units, and $M^{OH}$ represents polymerized hydroxyalkyl acrylate monomer units where subscript a is 1 to 98% of the repeat units, b is 0 to 98% of the repeat units and c is at least 1% of the monomer units and preferably 1-10%. The tosylate copolymer is used in amounts such that the molar equivalents of tosylate groups are 0.05 to 10 parts by weight, relative to 100 parts by weight of the benzoxazine. The copolymer may comprise from 1 to 98% tosyl-functional monomer units, and 0 to 98% acrylic ester monomer units, and at least 1% of hydroxyalkyl acrylate monomer units, provided there are sufficient molar equivalents of tosylate groups to promote the benzoxazine polymerization.

U.S. Pat. No. 6,207,786 (Ishida et al.) states that the polymerization of benzoxazine monomers to a polymer is believed to be an ionic ring opening polymerization which converts the oxazine ring to another structure, e.g., linear polymer or larger heterocyclic rings. Using the acid-catalyzed model of polymerization, the tosylate-functional (co) polymers may thermally elimination toluenesulfonic acid:

Acid-catalyzed polymerization is reported to yield poly (benzoxazines) having the following generic phenolic and/ or phenoxy repeat units. See U.S. Pat. No. 6,625,440 (Ishida et al).

Scheme 1

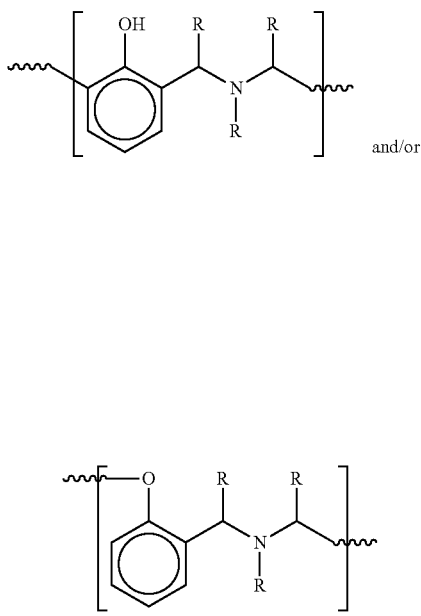

Consistent with the proposed acid-catalyzed mechanism, the tosylate functional (co)polymer may eliminate toluenesulfonic acid, which then catalyzes the polymerization of the benzoxazine. NMR and other experimental evidence suggest that the TsOH is eliminated by Sn2 displacement by the hydroxy group of a hydroxyalkyl acrylate monomer unit. As indicated in Scheme 2. With respect to the monomers of Formulas V and VI, $R^2$ is illustrated using a propylene group.

Scheme 2

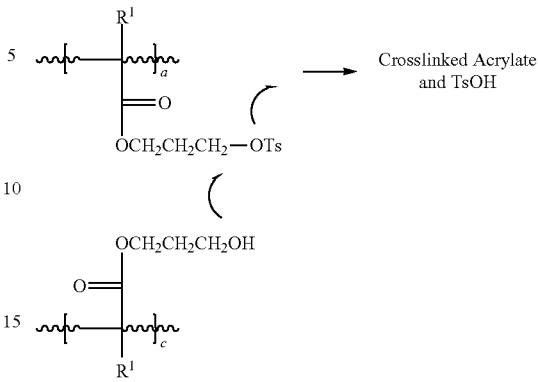

Upon polymerization of the benzoxazine, the result is an interpenetrating network of poly(benzoxazine) polymer and a crosslinked acrylic copolymer. More specifically, the product comprises an interpenetrating polymer network of a poly(benzoxazine) polymer having units VIII and/or IX supra, and a crosslinked acrylate of the formula $—[M^{tosyl}]_a—[M^{ester}]_b—[M^{OH}]_c$. It will be appreciated that, on polymerization of the benzoxazine, the polymer will be depleted in tosylate functional monomer units.

As the inventors believe the reaction proceeds by Sn2 displacement of the tosylate group by the hydroxy group of the hydroxyalkyl monomer units, the resulting crosslink will be an ether crosslink of the formula $\sim R^2—O—R^2\sim$ as depicted in Scheme 2. The post-polymerization acrylate polymer may be represented by the formula $—[M^{tosyl}]_{a*}—[M^{ester}]_b—[M^{OH}]_{c*}$, where a* is the amount of tosylate-functional monomer units as depleted, and may be zero, b is unchanged and c* is the amount of hydroxyalkyl acrylate monomer units, minus the number of crosslinks. It may be noted that if the acrylate copolymer is 100% substituted with tosylate groups, initial generation of free tosylate will serve to hydrolyze pendent tosylate groups, freeing additional hydroxyalkyl groups for further crosslinking The interpenetrating polymer network comprises 0.05 to 10 parts by weight of the acrylate copolymer, relative to 100 parts by weight of the poly(benzoxazine).

In some embodiments the curable benzoxazine composition may comprise a co-catalyst. Suitable co-catalysts include those selected from the group of elemental sulfur, elemental selenium, a sulfide of a Group VA element (e.g., N, P, As, Sb, Bi) of the Periodic Table (referring to the older CAS or American group numbering system), a sulfide of a Group VIA element (e.g., O, S, Se, Te, Po), a selenide of a Group VA element, a selenide of a Group VIA element, and a combination thereof.

Desirably, the melting point of the selected added co-catalyst is lower than the thermal self-catalysis temperature of the benzoxazine employed.

Crystalline or amorphous forms of elemental sulfur may be used as a co-catalyst. Elemental sulfur is nominally described as a $S_8$ ring, although other polymers and oligomers are known. Various allotropic forms of elemental selenium may be used. Nominally, selenium sulfide refers to many different compounds of sulfur and selenium, but is generally given by the formula $SeS_2$. Phosphorus sesquisulfide, phosphorus pentasulfide, and tetrasulfur tetranitride can be used.

Other suitable co-catalysts are salts of an organometallic complex cation. Such compounds include cations that have at least one carbon atom bonded to a transition metal atom.

In certain embodiments of polymerizable compositions of the disclosure, the organometallic complex salt of the polymerizable compositions of the present disclosure is represented by the following formula:

$$[(L^1)_y(L^2)_z M]^{+q} X_n \qquad (XX)$$

wherein in Formula (XX):

M is selected from the group Cr, Ni, Mo, W, Mn, Tc, Re, Fe, Ru, Os, Co, Rh, and Ir;

$L^1$ and $L^2$ represent the same or different ligands contributing pi-electrons that can be selected from aromatic compounds and heterocyclic aromatic compounds, and the ligand is capable of contributing six pi-electrons to the valence shell of M;

q is an integer having a value of 1 or 2, the residual charge of the complex cation;

y and z are integers having a value of 0, 1, or 2, provided that the sum of y and z is equal to 2;

X is a suitable anion (one that does not interfere with the polymerization); and n is an integer having a value of 1 or 2, the number of complex anions required to neutralize the charge q on the complex cation.

Examples of ligands $L^1$ and $L^2$ in Formula (XX) include substituted an unsubstituted carboxylic and heterocyclic aromatic ligands having up to 25 rings, up to 100 carbon atoms, and up to 10 heteroatoms (selected from N, S, non-peroxidic O, P, As, Se, B, Sb, Te, Si, Ge, Sn), such as, for example, eta$^6$-benzene, eta$^6$-mesitylene, eta$^6$-toluene, eta$^6$-p-xylene, eta$^6$-o-xylene, eta$^6$-m-xylene, eta$^6$-cumene, eta$^6$-durene, eta$^6$-pentamethylbenzene, eta$^6$-hexamethylbenzene, eta$^6$-fluorene, eta$^6$-naphthalene, eta$^6$-anthracene, eta$^6$-perylene, eta$^6$-chrysene, eta$^6$-pyrene, eta$^6$-triphenylmethane, eta$^6$-paracyclophane, eta$^6$-carbazole, eta$^5$-cyclopentadienyl anion, for example, eta5-cyclopentadienyl anion, eta$^5$-methylcyclopentadienyl anion, eta$^5$-pentamethylcyclopentadienyl anion, eta$^5$-trimethylsilylcyclopentadienyl anion, eta$^5$-trimethyltincyclopentadienyl anion, eta$^5$-triphenyltincyclopentadienyl anion, eta$^5$-triphenylsilylcyclopentadienyl anion, and eta$^5$-indenyl anion.

In certain embodiments, $L^2$ in Formula (XX) represents the same or different ligands contributing pi-electrons that can be selected from cyclopentadienyl and indenyl anion groups, and the ligand is capable of contributing six pi-electrons to the valence shell of M.

Each of the ligands $L^1$ and $L^2$ in Formula (XX) can be substituted by groups that do not interfere with the complexing action of the ligand to the metal atom or that do not reduce the solubility of the ligand to the extent that competing with the metal atom does not take place. Examples of substituting groups, all of which typically have less than 30 carbon atoms and up to 10 hetero atoms (selected from N, S, non-peroxidic O, P, Ar, Se, Sb, Te, Si, Ge, Sn, and B), including hydrocarbyl groups such as methyl, ethyl, butyl, dodecyl, tetracosanyl, phenyl, benzyl, allyl, benzylidene, ethenyl, and ethynyl; cyclohydrocarbyl such as cyclohexyl; hydrocarbyloxy groups such as methoxy, butoxy, and phenoxy; hydrocarbylmercapto groups such as methylmercapto (thiomethoxy), phenylmercapto (thiophenoxy); hydrocarbyloxycarbonyl such as methoxycarbonyl and phenoxycarbonyl; hydrocarbylcarbonyl such as formyl, acetyl, and benzoyl; hydrocarbylcarbonyloxy such as acetoxy, and cyclohexanecarbonyloxy; hydrocarbylcarbonamido, for example, acetamido, benzamid; azo; boryl; halo, for example, chloro, iodo, bromo, and fluoro; hydroxy; cyano; nitro; nitroso; oxo; dimethylamino; diphenylphosphino; diphenylarsino; diphenylstibine; trimethylgermane; tributyltin; methylseleno; ethyltelluro; and trimethylsiloxy.

Ligands $L^1$ and $L^2$ in Formula (XX) independently can be a unit of a polymer, for example, the phenyl group in polystyrene, or polymethylphenylsiloxane; the carbazole group in polyvinylcarbazole; or the cyclopentadiene group in poly (vinylcyclopentadiene). Polymers having a weight average molecular weight up to 1,000,000 or more can be used.

Suitable anions, X, in Formula (XX), for use as the counterion in the ionic salts of the organometallic complex cation in the co-catalyst are those in which X can be represented by the following formula:

$$DQ_r \qquad (XXI)$$

wherein, in Formula (XI):

D is a metal from Groups IB (e.g., Cu, Ag, Au), IIB (e.g., Zn, Cd, Hg), IIIB (e.g., Sc, Y, La, Ac), IVB (e.g., Ti, Zr, Hf), VB (e.g., V, Nb, Ta), VIB (e.g., Cr, Mo, W), VIIB (e.g., Mn, Tc, Re), and VIIIB (e.g., Fe, Ru, Os, Co, Rh, Ir, Ni, Pd, Pt) or a metal or metalloid from Groups IIIA (e.g., B, Al, Ga, In, Tl), IVA (e.g., C, Si, Ge, Sn, Pb), and VA (e.g., N, P, As, Sb, Bi) of the Periodic Table (referring to the older CAS or American group numbering system).

Q is a halogen atom, hydroxyl group, a substituted or unsubstituted phenyl group, or a substituted or unsubstituted alkyl group; and r is an integer having a value of 1 to 6.

In certain embodiments of Formula (XI), the metal D is copper, zinc, titanium, vanadium, chromium, manganese, iron, cobalt, or nickel and the metalloids preferably are boron, aluminum, antimony, tin, arsenic, and phosphorus. In certain embodiments, the halogen atom, Q, is chlorine or fluorine. Illustrative of suitable anions are $B(phenyl)_4^-$, $B(phenyl)_3(alkyl)^-$, where alkyl can be ethyl, propyl, butyl, hexyl and the like, $BF_4^-$, $PF_6^-$, $AsF_6^-$, $SbF_6^-$, $FeCl_4^-$, $SnCl_5^-$, $SbF_5OH^-$, $AlCl_4^-$, $AlF_6^-$, $GaCl_4^-$, $InF_4^-$, $TiF_6^-$, $ZrF_6^-$, $B(C_6F_5)_4^-$, $B(C_6F_3(CF_3)_2)_4^-$.

Additional suitable anions, X, in Formula (XX), for use as the counterion in the ionic salts of the organometallic complex cations include those in which X is an organic sulfonate.

Illustrative of suitable sulfonate-containing anions are $CH_3SO_3^-$, $CF_3SO_3^-$, $C_6H_5SO_3^-$, p-toluenesulfonate, p-chlorobenzenesulfonate and related isomers. Additional suitable anions include tris-(highly fluorinated alkyl) sulfonyl methide, bis-(highly fluorinated alkyl) sulfonyl imide, and tris-(fluorinated aryl) sulfonyl methide, as described in U.S. Pat. No. 5,554,664.

In certain embodiments, the anions, X, in Formula (XX) include an anion selected from tris-(highly fluorinated alkyl) sulfonyl methide, bis-(highly fluorinated alkyl) sulfonyl imide, tris-(fluorinated aryl) sulfonyl methide, tetrakis-(fluorinated aryl) borate, organic sulfonate anions, and halogen-containing complex anions of a metal or metalloid (e.g., $SbF_6^-$, $PF_6^-$).

Exemplary such organometallic salts suitable for use as co-catalysts are described in International Publication No. WO 2002/000757 (Mahoney et al.), as well as U.S. Pat. No. 5,089,536 (Palazzotto), U.S. Pat. No. 5,059,701 (Keipert), and U.S. Pat. No. 5,191,101 (Palazzotto et al.), as well as EP Pub. Nos. 094,914 (Irving et al.), 094,915 (Meier et al.), and 126,712 (Meier et al.). Illustrations of their use are described in the Examples Section.

In some embodiments, the co-catalyst may comprise an acid-forming peroxide catalyst. Desirably the decomposition point of the selected catalyst is lower than the thermal self-catalysis temperature of the benzoxazine employed. In certain embodiments, the acid-forming peroxide catalyst includes a carboxyl group, acetyl group, phthalyl group, sulfonyl group, or a combination thereof. In certain embodiments, the acid-forming peroxide catalyst is selected from the group of a diacyl peroxide, a peroxydicarbonate, a peroxyester, and a combination thereof. Acid-forming peroxide co-catalyst are disclosed in Applicant's copending U.S. 61/746,209, filed 27 Dec. 2012 and incorporated herein by reference.

Various combinations of co-catalysts can be used if desired.

If a co-catalyst is used, it is present in an amount of at least 0.1 wt-%, based on the total weight of the polymerizable composition. If a co-catalyst is used, it is present in an amount of no greater than 10 wt-%, 5 wt-%, or 2 wt-%, based on the total weight of the polymerizable composition.

Curatives

Polymerizable compositions of the disclosure optionally include one or more curatives. Such curatives are selected from the group of a thiol compound, an amine compound, and a combination thereof. In certain embodiments, at least one of the thiol compound and the amine compound is polyfunctional. Such curatives can function as reactive diluents.

Useful such compounds have at least one nucleophilic functional group that ring-opens the benzoxazine. Such compounds are of the generally formula:

$$R^{30}\text{---}(ZH)_p \quad (XII)$$

wherein, in Formula (XII):
$R^{30}$ is a (hetero)hydrocarbyl group;
each Z is independently —S— or —NR$^{31}$, where $R^{31}$ is H or a hydrocarbyl group, including aryl and alkyl; and
p is 1 to 6 (in certain embodiments, p is at least 2).

As mentioned above, the polymerization of benzoxazine monomers to a polymer is believed to be an ionic ring opening polymerization which converts the oxazine ring to another structure, e.g., linear polymer or larger heterocyclic rings. It is thought that a chain transfer step(s) limits the molecular weight of the resulting polymer and causes some branching. The ring-opening reaction may be represented by the following Scheme I for reaction of a benzoxazine based on bisphenol A with a curative of formula $R^{10}$—$(ZH)_2$ to form a polymeric material:

Scheme I

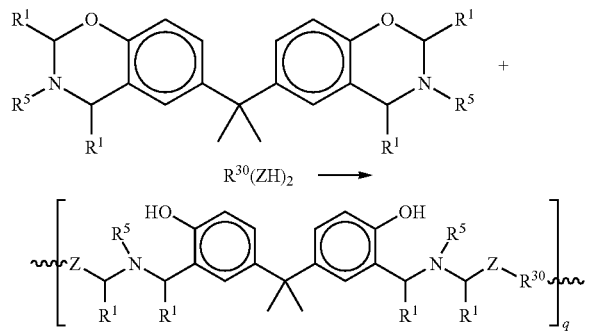

In Scheme I:
each $R^1$ is independently H or an alkyl group, and is the residue of an aliphatic aldehyde,
Each $R^5$ is independently a (hetero)hydrocarbyl residue of a primary amino compound;
each $R^{30}$ is independently a (hetero)hydrocarbyl group;
Z is a —S— or —NR$^{11}$, wherein each $R^{11}$ is H or a hydrocarbyl group, including aryl and alkyl p is 1 to 6, or 2 to 6; and
q is the number of repeat units and is at least 1 (in certain embodiments, q is at least 2).

Although the curative illustrated in Scheme 1 only has two —ZH groups, other curatives can have more than two —ZH groups. Thus, after reacting with two benzoxazine groups, such curatives can have additional —ZH groups available for further reactions with additional benzoxazine groups. Further, in embodiments where the starting benzoxazine was prepared with a polyamine, $R^5$ groups may be connected to additional benzoxazine groups. Note further that as the composition comprises at least one polyfunctional thiol compound or amine compound, polymeric reaction products result.

In these embodiments there is an excess of benzoxazine, as an unreacted benzoxazine will homopolymerize in the presence of the catalyst to form a coextensive mixture or polymer network of benzoxazine adducts with the curative of Formula (XII) and poly(benzoxazines). In such embodiments, the molar amounts ratio of benzoxazine groups to the sum of amine and/or thiol "Z" groups from the compound $R^{10}$—$(ZH)_p$, is 3:1 to 100:1, or in certain embodiments 4:1 to 50:1.

With reference to the curative of Formula (XII), $R^{30}$ $(ZH)_p$, the benzoxazine ring may be ring-opened by an amine compound. Useful amine compounds correspond to primary and secondary amines of the formula:

$$R^{30}(NHR^{11})_p \quad (XIII)$$

wherein, in Formula (XIII), $R^{30}$, $R^{11}$, and p are as defined above for Formula (XII). Such compounds include primary and secondary (hetero)hydrocarbyl monoamines and polyamines. In the compounds of Formula (VIII), the $R^{10}$ may be (hetero)hydrocarbyl group that has a valence of p, and is the residue of a mono-, di- or higher amine having at least one primary amine group. The $R^{30}$ can be an alkyl, a cycloalkyl or aryl, and p is 1 to 4, or 2 to 4. In certain embodiments, the $R^{30}$ is selected from mono- and polyvalent (hetero)hydrocarbyl (i.e., alkyl and aryl compounds having 1 to 30 carbon atoms, or alternatively (hetero)hydrocarbyl including heteroalkyl and heteroaryl having 1 to twenty heteroatoms of oxygen). Each $R^{11}$ is independently H or a hydrocarbyl group, including aryl and alkyl, and p is 1 to 6, or 2 to 6. It will be clear to one skilled in the art that the same amines used in the preparation of the benzoxazines will also be useful in the ring-opening reaction.

The benzoxazine ring may also be opened with thiols of the formula:

$$R^{30}\text{---}(SH)_p \quad (XIV)$$

wherein, in Formula (XIV), $R^{30}$ and p are as defined above for Formula (XII). That is, in the compounds of Formula (XIV), p is 1 to 6, or 2 to 6, and $R^{30}$ includes a (hetero) hydrocarbyl group, including aliphatic and aromatic monothiols and polythiols. $R^{30}$ may optionally further include one or more functional groups including hydroxyl, acid, ester, cyano, urea, urethane and ether groups.

In some preferred embodiments, the thiol compounds of Formula (XIV) are of the formula:

$$R^{32}\text{---}[(CO_2)_x\text{---}R^{33}\text{---}SH]_y \quad (XV)$$

wherein in Formula (XV):
R$^{32}$ is an alkylene group, an aryl group, an oxyalkylene group, or combination thereof; R$^{33}$ is a divalent hydrocarbyl group;
x is 0 or 1; and
y is 1 to 6, preferably 2 to 6.

In certain embodiments, the compounds of Formulas (XV) to are those in which R$^{32}$ is an alkylene group.

Useful alkyl thiols include methyl, ethyl and butyl thiol. Other useful thiols include 2-mercaptoethanol, 3-mercapto-1,2-propanediol, 4-mercaptobutanol, mercaptoundecanol, 2-mercaptoethylamine, 2,3-dimercaptopropanol, 3-mercaptopropyltrimethoxysilane, mercaptoalkanoic acids and esters thereof including mercaptoproionic acid, 2-chloroethanethiol, 2-amino-3-mercaptopropionic acid, dodecyl mercaptan, thiophenol, 2-mercaptoethyl ether, and pentaerythritol tetrathioglycolate. Specific examples of useful polythiols include dimercaptodiethyl sulfide; 1,6-hexanedithiol; 1,8-dimercapto-3,6-dithiaoctane; propane-1,2,3-trithiol; 1,2-bis[(2-mercaptoethyl)thio]-3-mercaptopropane; tetrakis(7-mercapto-2,5-dithiaheptyl)methane; and trithiocyanuric acid.

Another useful class of polythiols includes those obtained by esterification of a polyol with a terminally thiol-substituted carboxylic acid (or derivative thereof such as esters or acyl halides) including α- or β-mercaptocarboxylic acids such as thioglycolic acid or β-mercaptopropionic acid or esters therof. Useful examples of compounds thus obtained include ethylene glycol bis(thioglycolate), pentaerythritol tetrakis(3-mercaptopropionate), ethylene glycol bis(3-mercaptopropionate), trimethylolpropane tris(thioglycolate), trimethylolpropane tris(3-mercaptopropionate), pentaerythritol tetrakis(thioglycolate) pentaerythritol tetrakis(3-mercaptopropionate), all of which are commercially available. A specific example of a polymeric polythiol is polypropylene ether glycol bis(3-mercaptopropionate) which is prepared from polypropylene-ether glycol (e.g., that available under the trade name PLURAXOL P201 from BASF Wyandotte Chemical Corp.) and 3-mercaptopropionic acid by esterification.

In some embodiments, useful thiols include those thiols derived from epoxy compounds. The polythiol may be derived from the reaction between H$_2$S (or equivalent) and an epoxy resin having two or more functional groups and preferably having a molecular weight of less than 1000. For example, bifunctional epoxy resins, such as a bisphenol A epoxy resin and a bisphenol F epoxy resin, and novolak epoxy resins, such as a phenolic novolak epoxy resin and a cresol novolak epoxy resin, or amine epoxy resins, can be used. In addition, generally known polyfunctional epoxy resins, heterocycle-containing epoxy resins, and alicyclic epoxy resins can be used. These epoxy resins may be used alone or in combinations of two or more chemical types or molecular weight ranges.

A particularly useful polythiol is that derived from bisphenol-A diglycidyl ether, available as QX-11 from Japan Epoxy Resins, having a thiol equivalent weight of approximately 245 and the following general structure, where n is at least 1:

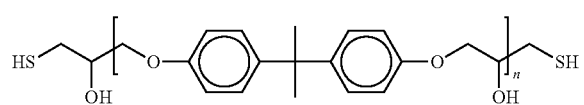

(XIV)

Useful soluble, high molecular weight thiols include polyethylene glycol di(2-mercaptoacetate), and those resins available under the trade names LP-3 (supplied by LP North America, Houston, Tex.) and PERMAPOL P3 (supplied by Products Research & Chemical Corp., Glendale, Calif.), and compounds such as the adduct of 2-mercaptoethylamine and caprolactam.

The compounds of Scheme I may be prepared by combining the benzoxazine compounds with a curative either neat or in a suitable solvent. Suitable solvents include those in which the reactants dissolve, preferably at room temperature, and that are nonreactive with the various components in the polymerizable composition. Examples of suitable solvents include butyl acetate, toluene, xylene, tetrahydrofuran, ethylene glycol dimethyl ether and the like. Heating is generally unnecessary as the thiol and amine-induced ring opening is exothermic.

Combinations of various curatives can be used if desired.

If used, a curative is present in an amount of at least 5%, and often as much as 60% of the benzoxazine equivalent.

Polymerizable compositions of the present disclosure may include a film-forming material, which can be in the form of monomers, oligomers, polymerizable pre-polymers, polymers, or a combination thereof. These materials, as the name suggests, enable the formation of benzoxazine-containing films that reduce the brittleness of typical benzoxazines. Such films are typically flexible and tacky over a desired temperature window in the sub-ambient to benzoxazine-cure temperature range. The film-former may be reactive or nonreactive with the benzoxazine, or any other components such as the catalyst, co-catalyst, curative, toughener, and the like.

In some embodiments the film-formers are materials, particularly oligomers or polymers, which form a homogenous mixture with the benzoxazine/catalyst mixtures at processing temperatures, preferably from sub-ambient to the processing of the polymerizable benzoxazine composition. Catalyst present in these films provides for excellent shelf life even when the films are stored at elevated temperatures.

Optionally, film formers can have reactive functional groups that react with a portion of the benzoxazine. The film-forming material may include a reactive film-forming material that includes one or more functional groups reactive with the benzoxazine, such as those selected from the group of a thiol, an amine, a benzoxazine, a formaldehyde, an aldehyde, and a combination thereof. The reactive film-forming material may include a compound that can react with, and be bonded to, the benzoxazine. The presence of one or more functional groups can afford increased processability options for said films: they can be processed above or below the reaction temperature of the reactive group to afford variable degree of tack, flexibility, and other desirable properties. Examples of such reactive film formers include, but are not limited to, amine-terminated butadiene-nitrile (ATBN), hydroxy-terminated butadiene-nitrile (HOTBN), carboxy-terminated butadiene-nitrile CTBN, amine-terminated poly(alkylene oxides) (such as those available under the trade names JEFFAMINE and VERSALINK) and related compounds.

In some embodiment the reactive film-formers may have different reactive groups in the backbone and termini. Examples of such materials include the end-functional butadiene-nitrile rubbers such as ATBN, which has unsaturation in its repeat unit and amine functional reactive groups on its ends. The amine functional groups may react with the benzoxazine by nucleophilic ring-opening (e.g., as described herein with respect to the curatives), and the unsaturation may react with the catalyst by vulcanization.

Examples of suitable nonreactive film-forming polymers for coating formulations include acrylic polymers (e.g., poly(methyl methacrylate-co-ethyl acrylate) and poly(m-ethyl acrylate-co-acrylic acid)); polyurethanes (e.g., reaction products of aliphatic, cycloaliphatic or aromatic diisocyanates with polyester glycols or polyether glycols); polyolefins; polystyrene; copolymers of styrene with acrylate(s) (e.g., poly(styrene-co-butyl acrylate); polyesters, (e.g., polyethylene terephthalate, polyethylene terephthalate isophthalate, and polycaprolactone); polyamides, (e.g., polyhexamethylene adipamide); vinyl polymers, (e.g., poly(vinyl acetate/methyl acrylate) and poly(vinylidene chloride/vinyl acetate); polydienes, (e.g., poly(butadiene/styrene)); cellulosic polymer including cellulose ethers and cellulose esters, (e.g., ethyl cellulose and cellulose acetate/butyrate); polyimides; polysulfones; urethane-acrylate copolymers; and polyethers. Such polymers are available, for example, from commercial sources or may be prepared using methods and starting materials known in the art.

Combinations of various film-forming materials may be used if desired.

If used, film-forming material is present in an amount of at least 10 wt-%, and in certain embodiments, at least 25 wt-%, based on the total weight of the polymerizable composition. If used, film-forming material is present in an amount of no greater than 75 wt-%, and in certain embodiments, no greater than 50 wt-%, based on the total weight of the polymerizable composition.

Certain other optional additives may also be included, including, for example, tougheners, epoxy resin, and other reactive diluents. Such additives provide various functions (e.g., film formation). For example, a toughening agent may reduce brittleness and/or add strength to the composition after curing without interfering with curing. An epoxy resin may reduce the viscosity, lower Tg, and/or function as a carrier for a toughening agent.

It will be understood by one of skill in the art that one compound may form two or more different functions. For example, a compound may function as both a toughening agent and a curative.

In some embodiments, such additives will not react with the benzoxazine. In some embodiments, such additives may include reactive functional groups, particularly as end groups.

Examples of such reactive functional groups include, but are not limited to, amines, thiols, alcohols, epoxides, vinyls, and combinations thereof. Toughening agents are useful in polymerizable compositions of the present disclosure are polymeric compounds having both a rubbery phase and a thermoplastic phase such as: graft polymers having a polymerized, diene, rubbery core and a polyacrylate, polymethacrylate shell; graft polymers having a rubbery, polyacrylate core with a polyacrylate or polymethacrylate shell; and elastomeric particles polymerized in situ in the epoxide from free radical polymerizable monomers and a copolymerizable polymeric stabilizer.

Examples of useful toughening agents of the first type include graft copolymers having a polymerized, diene, rubbery backbone or core to which is grafted a shell of an acrylic acid ester or methacrylic acid ester, monovinyl aromatic hydrocarbon, or a mixture thereof, such as disclosed in U.S. Pat. No. 3,496,250 (Czerwinski). Exemplary rubbery backbones include polymerized butadiene or a polymerized mixture of butadiene and styrene. Exemplary shells including polymerized methacrylic acid esters are lower alkyl (C1-C4)substituted methacrylates. Exemplary monovinyl aromatic hydrocarbons are styrene, alpha-methylstyrene, vinyltoluene, vinylxylene, ethylvinylbenzene, isopropylstyrene, chlorostyrene, dichlorostyrene, and ethylchlorostyrene. It is important that the graft copolymer contain no functional groups that would poison the catalyst.

Examples of useful toughening agents of the second type are acrylate core-shell graft copolymers wherein the core or backbone is a polyacrylate polymer having a glass transition temperature below 0° C., such as polybutyl acrylate or polyisooctyl acrylate to which is grafted a polymethacrylate polymer (shell) having a glass transition above 25° C., such as polymethylmethacrylate.

The third class of toughening agents useful in the invention includes elastomeric particles that have a glass transition temperature ($T_g$) below 25° C. before mixing with the other components of the composition. These elastomeric particles are polymerized from free radical polymerizable monomers and a copolymerizable polymeric stabilizer that is soluble in the benzoxazine. The free radical polymerizable monomers are ethylenically unsaturated monomers or diisocyanates combined with co-reactive difunctional hydrogen compounds such as diols, diamines, and alkanolamines.

Useful toughening agents include core/shell polymers, such as methacrylate-butadiene-styrene (MBS) copolymer wherein the core is crosslinked styrene/butadiene rubber and the shell is polymethylacrylate (for example, those available under the trade names ACRYLOID KM653 and KM680, from Rohm and Haas, Philadelphia, Pa.), those having a core including polybutadiene and a shell including poly(methyl methacrylate) (for example, those available under the trade names KANE ACE M511, M521, B11A, B22, B31, and M901 from Kaneka Corporation, Houston, Tex. and CLEARSTRENGTH C223 from ATOFINA, Philadelphia, Pa.), those having a polysiloxane core and a polyacrylate shell (for example, those available under the trade names CLEARSTRENGTH S-2001 from ATOFINA and GENIOPERL P22 from Wacker-Chemie GmbH, Wacker Silicones, Munich, Germany), those having a polyacrylate core and a poly(methyl methacrylate) shell (for example, those available under the trade names PARALOID EXL2330 from Rohm and Haas and STAPHYLOID AC3355 and AC3395 from Takeda Chemical Company, Osaka, Japan), those having an MBS core and a poly(methyl methacrylate) shell (for example, those available under the trade names PARALOID EXL2691A, EXL2691, and EXL2655 from Rohm and Haas); and the like; and mixtures thereof.

As used above, for acrylic core/shell materials "core" will be understood to be an acrylic polymer having a $T_g$ of less than 0° C. and "shell" will be understood to be an acrylic polymer having a $T_g$ of greater than 25° C.

Other useful toughening agents include: carboxylated and amine terminated acrylonitrile/butadiene vulcanizable elastomer precursors, such as those available under the trade names HYCAR CTBN 1300X8, ATBN 1300X16, and HYCAR 1072 from B. F. Goodrich Chemical Co.; butadiene polymers, such as those available under the trade name HYCAR CTB; amine functional polyethers such as HCl 101 (i.e., polytetramethylene oxide diamine) a 10,000 MW, primary amine-terminated, compound from 3M Co., St. Paul, Minn., and those available under the trade name JEFFAMINE from Huntsman Chemical Co., Houston, Tex.; functional acrylic rubbers including acrylic core/shell materials, such as those available under the trade names ACRYLOID KM330 and 334 from Rohm & Haas; and core/shell polymers, such as methacrylate-butadiene-styrene (MBS) copolymer wherein the core is crosslinked styrene/butadiene rubber and the shell is polymethylacrylate (e.g., that available under the trade names ACRYLOID KM653 and KM680; Rohm and Haas). Useful liquid poly-butadiene hydroxyl terminated resins include those available under the trade names LIQUIFLEX H by Petroflex of Wilmington, Del., and HT 45 by Sartomer of Exton, PN.

Tougheners may include epoxy-terminated compounds, which can be incorporated into the polymer backbone. A typical, preferred, list of tougheners includes: acrylic core/shell polymers; styrene-butadiene/methacrylate core/shell polymers; polyether polymers; carboxylated acrylonitrile/butadienes; and carboxylated butadienes. Advantages can be obtained from the provision of the chain extension agent in a composition with an epoxy resin even in the absence of a toughening agent as described above. However, particular advantage is achieved from the presence of the toughening agent or combinations of different agents, as previously suggested.

It will be appreciated that some of the described natural and synthetic rubbers will have unsaturation in the chain that can be crosslinked by the catalyst. Thus, the catalyst will polymerize the benzoxazine, and concurrently vulcanize the rubber to for a coextensive network of poly(benzoxazine) and vulcanized rubber.

Various combinations of toughening agents can be used if desired.

If used, a toughening agent is present in a polymerizable composition in an amount of at least 3 wt-%, or at least 5 wt-%, based on the weight of the benzoxazine. If used, a toughening agent is present in a polymerizable composition in an amount of no greater than 35 wt-%, or no greater than 25 wt-%, based on the weight of the benzoxazine.

Other optional additives include epoxy resins. Such materials may function as a curative, a reactive diluent, or a co-reactant. The epoxy group does not react directly with the benzoxazine as do the amines or thiols of the curatives, but the phenolic group resulting from the ring opening of the benzoxazine may further react to ring-open the epoxy groups.

Polyepoxy compounds which can be utilized in the compositions of the disclosure include both aliphatic and aromatic polyepoxides. In certain embodiments, glycidyl aliphatic epoxides are preferred. The aromatic polyepoxides are compounds containing at least one aromatic ring structure, e.g., a benzene ring, and more than one epoxy group. Preferred aromatic polyepoxides include the polyglycidyl ethers of polyhydric phenols (e.g., bisphenol A derivative resins, epoxy cresol-novolac resins, bisphenol F derivative resins, epoxy phenol-novolac resins) and the glycidyl esters of aromatic carboxylic acids. The most preferred aromatic polyepoxides are the polyglycidyl ethers of polyhydric phenols.

Representative examples of aliphatic polyepoxides which can be utilized in the composition of the disclosure include 3',4'-epoxycyclohexylmethyl-3,4-epoxycyclohexanecarboxylate, 3,4-epoxycyclohexyloxirane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyl-dimethylmethane, and mixtures thereof. Preferred such polyepoxides do not include cycloaliphatic groups.

Representative examples of aromatic polyepoxides, which can be utilized in the composition of the disclosure, include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-(4-(2,3-epoxypropoxy)phenylpropane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,31-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. No. 3,018,262 (Schroeder) and U.S. Pat. No. 3,298,998 (McConnell et al.), as well as the derivatives described in the Handbook of Epoxy Resins by Lee and Neville, McGraw-Hill Book Co., New York (1967), and mixtures thereof.

An exemplary class of polyepoxy compounds is polyglycidyl ethers of polyhydric alcohol, particularly polyphenols. The glycidyl epoxy compounds are generally more reactive toward amines than cycloaliphatic epoxy compounds. In some embodiments, the epoxy compound generally has an epoxy equivalent weight (EW) of 170 to 4,000, or 170 to 1,000. The epoxide equivalent weight (EW) is defined as the weight in grams of the epoxy functional compound that contains one gram equivalent of epoxy (oxirane) functional groups.

If used, an epoxy resin is present in a polymerizable composition in an amount of at least 5 wt-%, or at least 3 wt-%, based on the weight of the benzoxazine. If used, a toughening agent is useful in a polymerizable composition in an amount of no greater than 35-wt-%, or no greater than 25 wt-%, based on the weight of the benzoxazine.

Other optional additives, or adjuvants, may be added to the compositions as desired. Examples of such other optional additives include as colorants, abrasive granules, anti-oxidant stabilizers, thermal degradation stabilizers, light stabilizers, conductive particles, tackifiers, flow agents, bodying agents, flatting agents, inert fillers, binders, blowing agents, fungicides, bactericides, surfactants, plasticizers, rubber tougheners, and other additives known to those skilled in the art. Such additives are typically substantially unreactive, such as fillers, both inorganic and organic. These adjuvants, if present, or other optional additives, are added in an amount effective for their intended purpose.

The choice and amounts of optional components depend on the needs of the specific application. For example, for a structural/semi-structural benzoxazine adhesive, the polymerizable composition could contain silica fillers, glass bubbles, and tougheners. These adjuvants add toughness to and reduce the density of the polymerized composition. For a protective coating, such as an abrasion resistant coating, which is generally hard, requires a significant portion of the formulation to be a hard resin that includes generally short chain lengths and high functionality. Coatings undergoing some flex require toughness which can be obtained by using the above-mentioned additive to increase toughness and increase flexibility. Clear coatings require the cured resins to have little to no phase separation. This is obtained by controlling the compatibility of the resins or controlling phase separation by cure rate.

Reaction conditions for curing the composition depend on the reactants and amounts used and can be determined by those skilled in the art. The curable compositions are made by mixing in any order the benzoxazine compound and the alkylating agent described above. Generally, the composition is then heated to a temperature between about 50 and 200° C., preferably between about 130-180° C., for a time of about 1-120 minutes.

Suitable sources of heat to cure the compositions of the invention include induction heating coils, ovens, hot plates, heat guns, infrared sources including lasers, microwave sources. Suitable sources of light and radiation include ultraviolet light sources, visible light sources, and electron beam sources.

Solvents can be used to assist in dissolution of the acrylic (co)polymer in the benzoxazine monomers, and also as a processing aid. It may be advantageous to prepare a concentrated solution of the alkylating agent in a small amount of solvent to simplify the preparation of the polymerizable composition. Useful solvents are lactones, such as gamma-butyrolactone, gamma-valerolactone; and epsilon-caprolactone; ketones such as acetone, methyl ethyl ketone, methyl isobutyl ketone, cyclopentanone and cyclohexanone; sulfones, such as tetramethylene sulfone, 3-methylsulfolane, 2,4-dimethylsulfolane, butadiene sulfone, methyl sulfone, ethyl sulfone, propyl sulfone, butyl sulfone, methyl vinyl sulfone, 2-(methylsulfonyl)ethanol, 2,2'-sulfonyldiethanol; sulfoxides, such as dimethyl sulfoxide; cyclic carbonates such as propylene carbonate, ethylene carbonate and vinylene carbonate; carboxylic acid esters such as ethyl acetate, methyl cellosolve acetate, methyl formate; and other solvents such as methylene chloride, nitromethane, acetonitrile, glycol sulfite and 1,2-dimethoxyethane (glyme).

Compositions of this invention are useful for coatings, foams, shaped articles, adhesives (including structural and semistructural adhesives), magnetic media, filled or reinforced composites, coated abrasives, caulking and sealing compounds, casting and molding compounds, potting and encapsulating compounds, impregnating and coating compounds, conductive adhesives for electronics, protective coatings for electronics, and other applications that are known to those skilled in the art. When uncured or partially cured, the benzoxazine compositions exhibit pressure-sensitive adhesive properties, including tack. In some embodiments, the present disclosure provides a coated article comprising a substrate, having a cured coating of the benzoxazine thereon.

To prepare a structural/semi-structural benzoxazine adhesive, the curable composition could contain additional adjuvants such as silica fillers, glass bubbles and tougheners. These adjuvants add toughness to and reduce the density of the cured composition.

To prepare protective coatings, the choice of materials depends on the needs of the specific application. Abrasion resistant coatings are generally hard and require a significant portion of the formulation to be a hard resin, which are generally short chain length and have high functionality. Coatings undergoing some flex require toughness which can be obtained by lowering the crosslink density of the cure formulation. Clear coatings require the cured resins to have little to no phase separation. This is obtained by controlling the compatibility of the resins or controlling phase separation by cure rate. Adjuvants could be added to these coating formulations in an amount effective for their intended use.

The composition may be coated onto substrates at useful thicknesses ranging from 25-500 micrometers or more. Coating can be accomplished by any conventional means such as roller, dip, knife, or extrusion coating. Solutions of the curable composition may be used to facilitate coating. Stable thicknesses are necessary to maintain the desired coating thickness prior to crosslinking of the composition to form the crosslinked composition.

Useful substrates can be of any nature and composition, and can be inorganic or organic. Representative examples of useful substrates include ceramics, siliceous substrates including glass, metal, natural and man-made stone, woven and nonwoven articles, polymeric materials, including thermoplastic and thermosets, (such as polymethyl (meth)acrylate), polycarbonate, polystyrene, styrene copolymers, such as styrene acrylonitrile copolymers, polyesters, polyethylene terephthalate), silicones, paints (such as those based on acrylic resins), powder coatings (such as polyurethane or hybrid powder coatings), and wood and composites of the foregoing materials.

The instant disclosure further provides a pressure-sensitive adhesive which comprises a coating of the uncured or partially cured benzoxazine composition on a suitable substrate, such as an adhesive tape backing. A preferred method of preparing a pressure-sensitive adhesive article comprises partially curing the novel composition to a useful coating viscosity, coating the partially crosslinked composition onto a substrate (such as a tape backing) and further curing the composition. Useful coating viscosities are generally in the range of 500 to 10,000 cps.

EXAMPLES

Differential Scanning Calorimetry

Differential Scanning Calorimetry ("DSC") was performed on an aliquot of a given reaction mixture which was placed into an open aluminum DSC pan and heated at 10° C./min from 25° C. to 300° C. in a Differential Scanning Calorimeter (obtained from Seiko Instruments USA, Inc., Torrance, Calif., or from TA Instruments, New Castle, Del.).

Materials and Abbreviations Employed

| | |
|---|---|
| AIBN | Azobisisobutyronitrile, a radical initiator obtained from Sigma-Aldrich Corp., St. Louis, MO |
| aniline | aniline, obtained from Sigma-Aldrich Corp. |
| BZ-1 monomer | A benzoxazine monomer obtained from Huntsman Chemical, Houston, TX, under the trade designation "ARALDITE MX 35600" |
| BZ-2 monomer | para-cresol benzoxazine monomer prepared according to Preparative Example 48 of Applicant's copending US 61/817344 |
| p-cresol | p-cresol obtained from Sigma-Aldrich Corp. |
| DMAP | (4-dimethylaminopyridine), obtained from Sigma-Aldrich Corp. |
| 4-hydroxy-n-butyl acrylate | an acrylate ester obtained from Sigma-Aldrich Corp. |
| 3-hydroxypropyl acrylate | an acrylate ester obtained from Sigma-Aldrich Corp. |
| KB-1 | (2,2-dimethoxy-2-phenylacetophenone), a photoinitiator obtained from Sartomer Co., West Chester, PA, under the trade designation "ESACURE KB-1 PHOTOINITIATOR" |
| methylene chloride | Methylene chloride was obtained from Sigma-Aldrich Corp. |
| paraformaldehyde | paraformaldehyde, obtained from Sigma-Aldrich Corp. |
| tosyl chloride | p-toluenesulfonyl chloride, obtained from Sigma-Aldrich Corp. |
| triethylamine | triethylamine, obtained from Sigma-Aldrich Corp. |

Preparative Example 1 ("PE-1")

Synthesis of poly(acryloyl-4-oxybutyl-tosylate)

To 9.5 g (0.05 mol) of tosyl chloride were added 5.05 grams (0.05 mol) of triethylamine, 100 mg of DMAP and 7.21 grams (0.05 mol) of 4-hydroxy-n-butyl acrylate. The mixture was dissolved in 50 mL of methylene chloride and allowed to stir overnight at room temperature. Precipitate was filtered to reveal a nearly quantitative yield (6.7 grams of the precipitate, corresponding to 0.049 mol triethylammonium hydrochloride) and the solution was evaporated under reduced pressure at 30° C. to remove the solvent, yielding 13.2 grams (0.044 mol; corresponding to a yield of 88%) of acryloyl-4-oxybutyl-tosylate monomer, as confirmed by $^1$H- and $^{13}$C-NMR.

UV Reaction of acryloyl-4-oxybutyl-tosylate Monomer

Into 1 gram of the acryloyl-4-oxybutyl-tosylate monomer were dissolved 10 mg of KB-1 photoinitiator. The solution was knife coated between two silicone coated layers of poly(ethylene terephthalate) ("PET") release liner to 10 mil (250 micrometer) thickness and placed under UV lights for 10 minutes (4×15 Watt Sylvania 350 Blacklight (F15T8/350BL+2×15 Watt Sylvania 350 Blacklight Blue F15T8/350BLB. 5 cm from the bulbs and for 10 minutes), during which the poly(acryloyl-4-oxybutyl-tosylate) was produced as a tacky, opalescent, colorless to white material.

Thermal Reaction of acryloyl-4-oxybutyl-tosylate Monomer

Into 1 gram solution of acryloyl-4-oxybutyl-tosylate monomer in 25 ml of deuterated chloroform (CDCl$_3$) were dissolved 100 mg of AIBN initiator. The solution was heated to boil and kept under reflux for 14 hours. $^1$H-, $^{13}$C-, HSQC- and HMBC-NMR were used to confirm that poly(acryloyl-4-oxybutyl-tosylate) was produced as a major (>80%) copolymer, accompanied with a minor (<20%) component of 4-hydroxybutyl acrylate copolymer.

Thermolysis of poly(acryloyl-4-oxybutyl-tosylate)

A 0.5 gram portion of poly(acryloyl-4-oxybutyl-tosylate) was heated neat in a closed vial at 180° C. for 15 minutes, and the resulting product was found to be only partially soluble in any of DMSO-d6, CDCl$_3$, or pyridine-d5 even when heated, nor was the resulting product fully soluble in hot mixtures of those deuterated solvents. NMR analysis of the soluble fraction confirmed the liberation of free p-toluenesulfonic acid accompanied by disappearance of $^1$H-NMR peaks associated with pendant hydroxybutyl functionalities. Together with the formation of the insoluble fraction that suggests the crosslinking of the acrylate takes place upon thermolysis of the P-4OBTA polymer.

Example 1 ("EX-1")

BZ-1 Catalysis using poly(acryloyl-4-oxybutyl-tosylate

To poly(acryloyl-4-oxybutyl-tosylate) (0.050 gram, prepared according to Preparative Example 1) was added to 1 gram of BZ-1 monomer, and the mixture was heated at 100° C. for 1 minute in an aluminum pan while stirring. The mixture was allowed to cool to room temperature, and an aliquot was subject to thermogravimetric ("TGA") analysis. The TGA analysis showed an observed weight loss of less than 2% after heating at 150° C. for 2 hours, and less than 2.5% after heating at 200° C. for 1 hour. The remainder of the mixture was ground to a fine powder and mixed thoroughly. An aliquot of the ground powder was taken to obtain a DSC measurement, with results as summarized in Table 1.

Preparative Example 2 ("PE-2")

Synthesis of poly (acryloyl-3-oxypropyl-tosylate)

To 9.5 g (0.05 mol) of tosyl chloride were added 7.25 grams (0.075 mol) of triethylamine, 100 mg of DMAP and 6.5 grams (0.05 mol) of 3-hydroxypropyl acrylate. The mixture was dissolved in 50 mL methylene chloride and allowed to stir overnight at room temperature. Precipitate was filtered to reveal yield (4.7 grams of precipitate, corresponding to 0.034 mol triethylammonium hydrochloride) and the solution was washed with dilute HCl and the organic layer then evaporated under reduced pressure at 30° C. to remove the solvent, yielding 8.5 grams (0.03 mol; corresponding to a yield of 60%) of acryloyl-3-oxypropyl-tosylate monomer, as confirmed by $^1$H and $^{13}$C NMR.

Into 1 gram of the acryloyl-oxypropyl-tosylate monomer were dissolved 10 mg of KB-1 photoinitiator. The solution was knife coated between two silicone coated PET release liners to 10 mil (250 micrometer) thickness and placed under UV lights for 10 minutes, during which the poly(acryloyl-3-oxypropyl-tosylate) was produced as a tacky, opalescent, colorless to white material was produced.

Example 2 (Ex-2)

BZ-1 Catalysis using poly(acryloyl-3-oxypropyl-tosylate)

To poly(acryloyl-3-oxypropyl-tosylate) (0.050 gram, prepared according to Preparative Example 2) was added to 1 gram of BZ-1 monomer, and the mixture was heated at 100° C. for 1 minute in an aluminum pan while stirring. The mixture was allowed to cool to room temperature. The mixture was then ground to a fine powder and mixed thoroughly. An aliquot of the ground powder was taken to obtain a DSC measurement, with results as summarized in Table 1.

Preparative Example 3 ("PE-3")

Synthesis of p-cresol benzoxazine ("BZ-2")

Para-cresol benzoxazine was prepared using conventionally employed procedures. To wit, 10.8 grams (0.1 mol) p-cresol was added to 200 ml of chloroform solution of 9.31 grams (0.1 mol) aniline and 6 grams (0.2 mol) of paraformaldehyde under reflux. The solution was refluxed for 18 hours, allowed to cool to room temperature, at which time the organic phase was collected from the aqueous (formed during the ring closure). The desired product was isolated under reduced pressure from the organic phase at essentially a quantitative yield. Product structure and purity were confirmed via $^1$H and $^{13}$C NMR.

Example 3

Polymerization of BZ-2 using poly(acryloyl-4-oxybutyl-tosylate)

To 1 gram of para-cresol benzoxazine (BZ-2) (prepared according to procedure employed in Preparative Example 48 in Applicant's copending 61/817344) were added 0.1 grams of poly(acryloyl-4-oxybutyl-tosylate) prepared according to Preparative Example 1 above, and the mixture was heated to 100° C. and stirred until uniform. The mixture was then heated at 180° C. for 1 hour and the DMSO-d6/CDCl₃ soluble fraction was analyzed by $^1$H-, $^{13}$C-, HSQC- and HMBC-NMR. The NMR analysis confirmed acid-catalyzed polymerization of BZ-2 accompanied by benzyl aniline rearrangement with the o-o', o-p' and p-p' methylene linked anilines and phenols as the most dominant polymer species present. No residual benzoxazine monomer or polyacrylate were detected in the spectra. These findings are consistent with the liberated p-toluenesulfonic acid-catalyzed polymerization of benzoxazine monomer accompanied by the in-situ crosslinking of the acrylate to form a benzoxazine-acrylate interpenetrating polymer network.

TABLE 1

| Sample | Composition neat | Structure | Onset (° C.) | Peak (° C.) | Exotherm (J/g) |
|---|---|---|---|---|---|
| PE-1 | Poly(acryloyl-4-oxybutyl-tosylate) (neat) | | ND* | 244 | ND* |
| PE-2 | Poly(acryloyl-oxypropyl-tosylate) (neat) | | ND* | 205 | ND* |
| EX-1 | 5% Poly(acryloyl-4-oxybutyl-tosylate) in BZ-1 | | 186 | 218 | 275 |
| EX-2 | 5% Poly(acryloyl-oxypropyl-tosylate) in BZ-1 | | 199 | 224 | 297 |

*ND = not determined

What is claimed is:

1. A polymerizable composition comprising:
   a) a benzoxazine, and
   b) a (meth)acrylate copolymer having pendent tosylate groups;
   where the benzoxazine is of the formula:

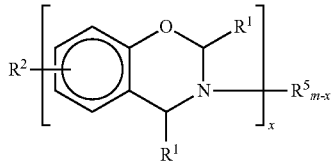

wherein
   each $R^1$ is H or an alkyl group, and is the residue of an aliphatic aldehyde,
   $R^2$ is H, a covalent bond, a phenol or a polyvalent (hetero)hydrocarbyl group;
   $R^5$ is aryl residue of a primary amino compound, $R^5(NH_2)_m$, where $R^5$ is an aryl group, m is 1-4;
   and x is at least 1.

2. The polymerizable composition of claim 1 wherein the (meth)acrylate copolymer comprises polymerized (meth)acryloyl oxyalkyl tosylate units.

3. The polymerizable composition of claim 2 wherein the (meth)acryloyl oxyalkyl tosylate units are derived from a monomer of the formula

wherein
   $R^1$ is H or $CH_3$;
   $R^2$ is an $C_2$-$C_{10}$ alkylene, optionally containing one or more ether oxygen atoms, and
   OTs is a tosylate (toluene sulfonate) group.

4. The polymerizable composition of claim 2, wherein 1 to 100% of the monomer units of the copolymer are (meth)acryloyl oxyalkyl tosylate units.

5. The polymerizable composition of claim 3 wherein $R^2$ is an alkyleneoxy groups of the formula —$C_nH_{2n}$—O—$C_mH_{2m}$—.

6. The polymerizable composition of claim 4 wherein $R^2$ is a poly(alkyleneoxy) group.

7. The polymerizable composition of claim 1 wherein the a (meth)acrylate copolymer having pendent tosylate groups is used in amounts such that the molar equivalents of tosylate groups are 0.05 to 10 parts by weight, relative to 100 parts by weight of the benzoxazine.

8. The polymerizable composition of claim 1 further comprising hydroxyalkyl (meth)acrylate monomer units.

9. The polymerizable composition of claim 1, wherein the copolymer is of the formula —$[M^{tosyl}]_a$—$[M^{ester}]_b$—$[M^{OH}]_c$, where $M^{tosyl}$ represents polymerized tosylate functional monomer units having subscript "a" repeat units, $M^{ester}$ represents polymerized acrylic ester monomer units having subscript "b" repeat units, and $M^{OH}$ represents polymerized hydroxyalkyl acrylate monomer units having subscript "c" repeat units.

10. The polymerizable composition of claim 9, where subscript a is 1 to 98% of the repeat units, b is 0 to 98% of the repeat units and c is at least 1% of the monomer units.

11. The polymerizable composition of claim 1 further comprising a toughening agent, wherein said toughening agent is present at between about 3% and 35% by weight of the benzoxazine.

12. The polymerizable composition of claim 1, further comprising a co-catalyst.

13. The polymerizable composition of claim 1 further comprising a curative, wherein the curative is selected from the group of a thiol compound, an amine compound, and a combination thereof.

14. An interpenetrating polymer network comprising a poly(benzoxazine) polymer and a crosslinked (meth)acrylate polymer, derived from the polymerizable composition of claim 1.

15. The interpenetrating polymer network of claim 14 wherein the poly(benzoxazine) comprises units of the formula(s):

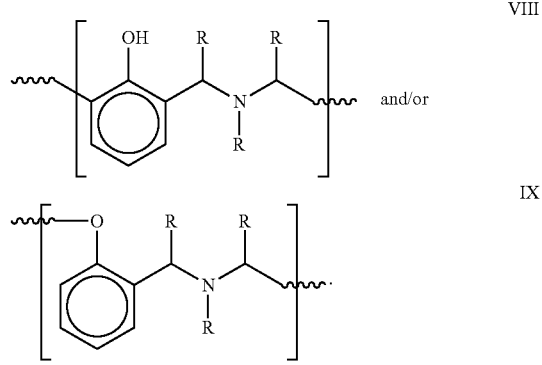

16. The interpenetrating polymer network of claim 14 comprising 0.05 to 10 parts by weight of the crosslinked acrylate copolymer, relative to 100 parts by weight of the poly(benzoxazine).

17. A method of preparing a poly(benzoxazine) comprising the step of heating the composition of claim 1 to a temperature sufficient to initiate polymerization.

* * * * *

UNITED STATES PATENT AND TRADEMARK OFFICE
CERTIFICATE OF CORRECTION

PATENT NO. : 10,040,905 B2
APPLICATION NO. : 15/023753
DATED : August 7, 2018
INVENTOR(S) : Ilya Gorodisher It is certified that error appears in the above-identified patent and that said Letters Patent is hereby corrected as shown below:

In the Specification

Column 9,
Line 56, delete "N." and insert -- N, --, therefor.

Column 22,
Line 27, delete "(Ex-2)" and insert -- (EX-2) --, therefor.

Signed and Sealed this
Eighteenth Day of June, 2019

Andrei Iancu
*Director of the United States Patent and Trademark Office*